United States Patent
Vukich et al.

(10) Patent No.: US 12,165,144 B2
(45) Date of Patent: *Dec. 10, 2024

(54) TRANSACTION PLATFORM THAT PERMITS CASH PAYMENTS FOR ONLINE TRANSACTIONS

(71) Applicant: Capital One Services, LLC, McLean, VA (US)

(72) Inventors: Adam Vukich, Alexandria, VA (US); Sarah J. Cunningham, Arlington, VA (US); Tyler Maiman, Melville, NY (US); Michael Mossoba, Arlington, VA (US); Leeyat Bracha Tessler, Washington, DC (US); Bryant Yee, Washington, DC (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/297,740

(22) Filed: Apr. 10, 2023

(65) Prior Publication Data

US 2023/0245116 A1 Aug. 3, 2023

Related U.S. Application Data

(63) Continuation of application No. 16/944,684, filed on Jul. 31, 2020, now Pat. No. 11,625,716.

(51) Int. Cl.
*G06Q 20/38* (2012.01)
*G06Q 20/34* (2012.01)

(52) U.S. Cl.
CPC ......... *G06Q 20/385* (2013.01); *G06Q 20/351* (2013.01); *G06Q 20/38215* (2013.01)

(58) Field of Classification Search
CPC ............... G06Q 20/385; G06Q 20/351; G06Q 20/38215
See application file for complete search history.

(56) References Cited

U.S. PATENT DOCUMENTS 8,321,342 B2 * 11/2012 Marshall .............. G06Q 20/385
  705/40
8,694,438 B1  4/2014 Jernigan et al.
(Continued)

FOREIGN PATENT DOCUMENTS

CN     103544605 A     1/2014

OTHER PUBLICATIONS

YouTube Video "How To Pay with Amazon PayCode at Western Union 2019 | Philippines" by Tech Bible, dated Oct. 17, 2019 https://www.youtube.com/watch?v=9BF681anIMc (hereinafter "Amazon Paycode") (Year: 2019).*
YouTube Video "How To Pay with Amazon PayCode at Western Union 2019 | Philippines" by Tech Bible, dated Oct. 17, 2019 https://www.youtube.com/watch?v=9BF681anIMc (hereinafter "Amazon Paycode") (Year: 2019).*

(Continued)

*Primary Examiner* — Raven E Yono
(74) *Attorney, Agent, or Firm* — Harrity & Harrity, LLP

(57) ABSTRACT

A device may configure a browser to permit cash payments for online transactions. The device may monitor a browser session of the browser. The device may detect, during the browser session, navigation of the browser to a transaction page of a website. The transaction page may be configured to facilitate an online transaction with the website. The device may determine, based on detecting the navigation of the browser to the transaction page, that a cash payment is to be provided. The device may cause a validation code to be generated. The device may cause, based on the validation code being processed, a virtual transaction card to be gen- (Continued)

erated. The device may facilitate, using virtual card information associated with the virtual transaction card, execution of the online transaction.

20 Claims, 12 Drawing Sheets

(56) References Cited

U.S. PATENT DOCUMENTS

| | | |
|---|---|---|
| 9,262,781 B2 | 2/2016 | Mackinnon et al. |
| 11,625,716 B2 | 4/2023 | Vukich et al. |
| 2001/0037263 A1 | 11/2001 | Hirota et al. |
| 2012/0290477 A1* | 11/2012 | Clausen ............... G06Q 20/385 705/43 |
| 2013/0226794 A1* | 8/2013 | Englebardt ............ G06Q 20/12 705/43 |
| 2013/0275247 A1* | 10/2013 | Ramaratnam .......... G06Q 20/20 705/16 |
| 2014/0136351 A1* | 5/2014 | Lennon ................. G06Q 20/14 705/16 |
| 2015/0199683 A1* | 7/2015 | Incedayi ................ G06Q 40/02 705/44 |
| 2017/0132624 A1* | 5/2017 | Muchang .............. G06F 40/174 |
| 2017/0180343 A1* | 6/2017 | de Ganon .......... G06Q 20/4014 |
| 2017/0186027 A1* | 6/2017 | Hudson .............. G06Q 30/0238 |

OTHER PUBLICATIONS

Marcel J. Mampaey, "Secure remittance transaction to bankless consumers in a fragmented applications market," dated Sep. 2011, IEEE, https://ieeexplore.ieee.org/document/6770164?source=IQplus (Year: 2011).*

Mahesh Maharjan, "System architecture for social security cash transfer through branchless banking in Nepal," dated Jan. 14, 2016, IEEE, https://ieeexplore.ieee.org/document/7380428?source=IQplus (Year: 2016).*

Definition of Dialogue Box, Jan. 10, 2018, 1 page. Retrieved from the Internet: [URL: https://www.collinsdictionary.com/us/dictionary/english/dialogue-box].

YouTube Video., "How To Pay with Amazon PayCode at Western Union 2019 | Philippines," Tech Bible, Oct. 17, 2019, pp. 1-10. Retrieved from the Internet: [URL: https://www.youtube.com/watch?v=9BF681anlMc].

* cited by examiner

TRANSACTION PLATFORM THAT PERMITS CASH PAYMENTS FOR ONLINE TRANSACTIONS

RELATED APPLICATION

This application is a continuation of U.S. patent application Ser. No. 16/944,684, filed Jul. 31, 2020 (now U.S. Pat. No. 11,625,716), which is incorporated herein by reference in its entirety.

BACKGROUND

An online provider may provide goods and/or services to a user based on an online transaction. The online transaction may involve transfer of funds from a transaction account (e.g., a bank account, a credit card account, a debit card account, and/or the like) in exchange for the goods and/or services. Some users may not have, or may not wish to use, a transaction account and may thus be unable to obtain goods and/or services via online transactions.

SUMMARY

In some implementations, a method includes configuring, by a device, a browser to permit cash payments for online transactions; monitoring, by the device, a browser session of the browser; detecting, by the device and during the browser session, that a user navigated the browser to a transaction page of a website, wherein the transaction page is configured to facilitate an online transaction with the website; requesting, by the device and based on detecting that the user navigated the browser to the transaction page, the user to indicate, via a user interface of the browser, whether a cash payment is to be made in connection with the online transaction; receiving, by the device and via the user interface, a user input that indicates that the online transaction is to involve the cash payment; causing, by the device, a validation code to be generated; providing, by the device and via the user interface, the validation code to be processed; causing, by the device and based on the validation code being processed, a virtual transaction card to be generated, the virtual transaction card being associated with a same value as a value of the cash payment; and facilitating, by the device and using virtual card information associated with the virtual transaction card, execution of the online transaction between the user and the website.

In some implementations, a device includes one or more memories; and one or more processors communicatively coupled to the one or more memories, configured to: detect navigation, via a browser, to a transaction page of a website, wherein the transaction page is configured to facilitate an online transaction with the website; request, via a user interface of the browser and based on detecting the navigation to the transaction page, that a user input be provided to indicate whether a cash payment is to be made in association with the online transaction; receive the user input; obtain, based on the user input indicating that the cash payment is to be made, a validation code; display, via the user interface, the validation code to be processed by an authorized device in association with the cash payment; determine that the validation code was processed by the authorized device; obtain, based on the validation code being processed by the authorized device, virtual card information associated with a virtual transaction card; and facilitate, using the virtual card information associated with the virtual transaction card, the online transaction.

In some implementations, a non-transitory computer-readable medium stores instructions, and the instructions include: one or more instructions that, when executed by the one or more processors, cause the one or more processors to: monitor a browser session of a browser; detect, during the browser session, navigation to a transaction page of a website, wherein the transaction page is configured to facilitate an online transaction with the website; determine, via a browser extension of the browser, that a cash payment is to be provided; generate a validation code and/or a transaction identifier to be processed in associated with the cash payment; receive, based on the validation code or the transaction code being processed, virtual card information associated with a virtual transaction card; and facilitate execution of the online transaction using the virtual card information associated with the virtual transaction card.

DETAILED DESCRIPTION

Figure 1A:
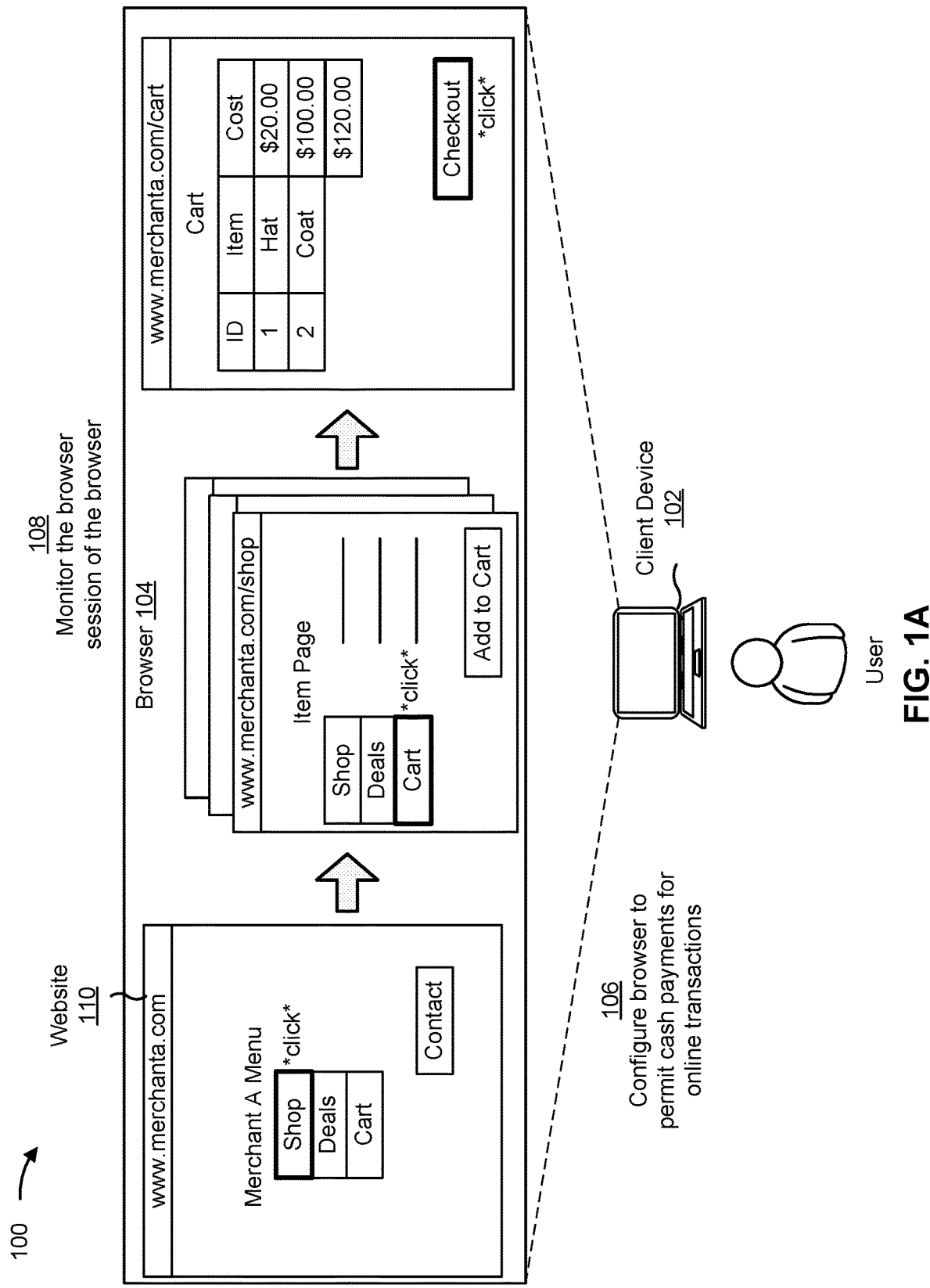
FIGS. 1A-1G are diagrams of one or more example implementations described herein.

The following detailed description of example implementations refers to the accompanying drawings. The same reference numbers in different drawings may identify the same or similar elements.

An online provider of goods and/or services (e.g., a retailer, a rental service, a restaurant, a grocery store, and/or the like) may operate online by offering the goods and/or services for sale and/or rent on a website. A user associated with a client device may access the website using a browser. After the user adds selected goods and/or services to an online cart for purchase, the website may request the user to input personal information (e.g., a name, an address, a phone number, an email address, and/or the like) and transaction account information (e.g., a bank account number, a routing number, a credit card number, a debit card number, an expiration date associated with the credit card number or the debit card number, a card verification value (CVV) associated with the credit card number or the debit card number, and/or the like) to execute an online transaction. Once the user submits the personal information and the transaction account information, funds from a transaction account of the user may be transferred to a transaction account of the online provider. In response, the online provider may provide the goods and/or services to the user (e.g., via shipment, via in-store pickup, via email, and/or the like) and thus complete the online transaction.

Compared to a strictly brick-and-mortar provider, an online provider may have a larger customer base, more access to data to predict behavior and/or preferences of customers, lower operational expenses, and/or the like. However, some potential customers of the online provider may not have a transaction account (e.g., a bank account, a credit card account, a debit card account, and/or the like), may prefer to use cash instead of a transaction account (e.g., to manage expenditures, to maintain anonymity, and/or the like), and/or the like. As a result, the online provider may limit the customer base and resulting revenue by excluding these potential customers. In some cases, the online provider may waste computing and/or networking resources modifying the website to implement a cash-based transaction system, becoming a member of a cash-based transaction system, and/or the like. Additionally, the potential customers may waste vehicle resources traveling to brick-and-mortar providers to obtain goods and/or services in exchange for cash payments.

Some implementations described herein provide a device (e.g., a client device executing a browser extension) that may permit websites to offer cash payments even when the websites are not configured to offer cash payments. The device may configure a browser to permit cash payments and may monitor a browser session of the browser. The device may detect, during the browser session, that a user navigated the browser to a transaction page of a website. The transaction page may be configured to facilitate an online transaction with the website. The device may request, based on detecting that the user navigated the browser to the transaction page, the user to indicate whether a cash payment is to be made in connection with the online transaction. The device may receive a user input that indicates that the online transaction is to involve the cash payment. The device may cause a validation code to be generated and provide the validation code to be processed. The device may cause, based on the validation code being processed, a virtual transaction card to be generated. The device may facilitate, using virtual card information associated with the virtual transaction card, execution of the online transaction between the user and the website.

By permitting cash payments for online transactions, the device may expand the customer base of the online provider to include customers who lack transaction accounts and/or choose to only use cash (e.g., to manage expenditures, to maintain anonymity, and/or the like). As a result, the device may increase revenue of the online provider and further increase access to data associated with customer behavior and/or preferences. Furthermore, the device may conserve computing and/or networking resources that the online provider may have otherwise consumed modifying the website to implement a cash-based transaction system, becoming a member of a cash-based transaction system, and/or the like. Additionally, the device may improve customer experience and conserve vehicle resources that customers might have otherwise wasted traveling to brick-and-mortar providers to make cash payments.

Figure 1B:
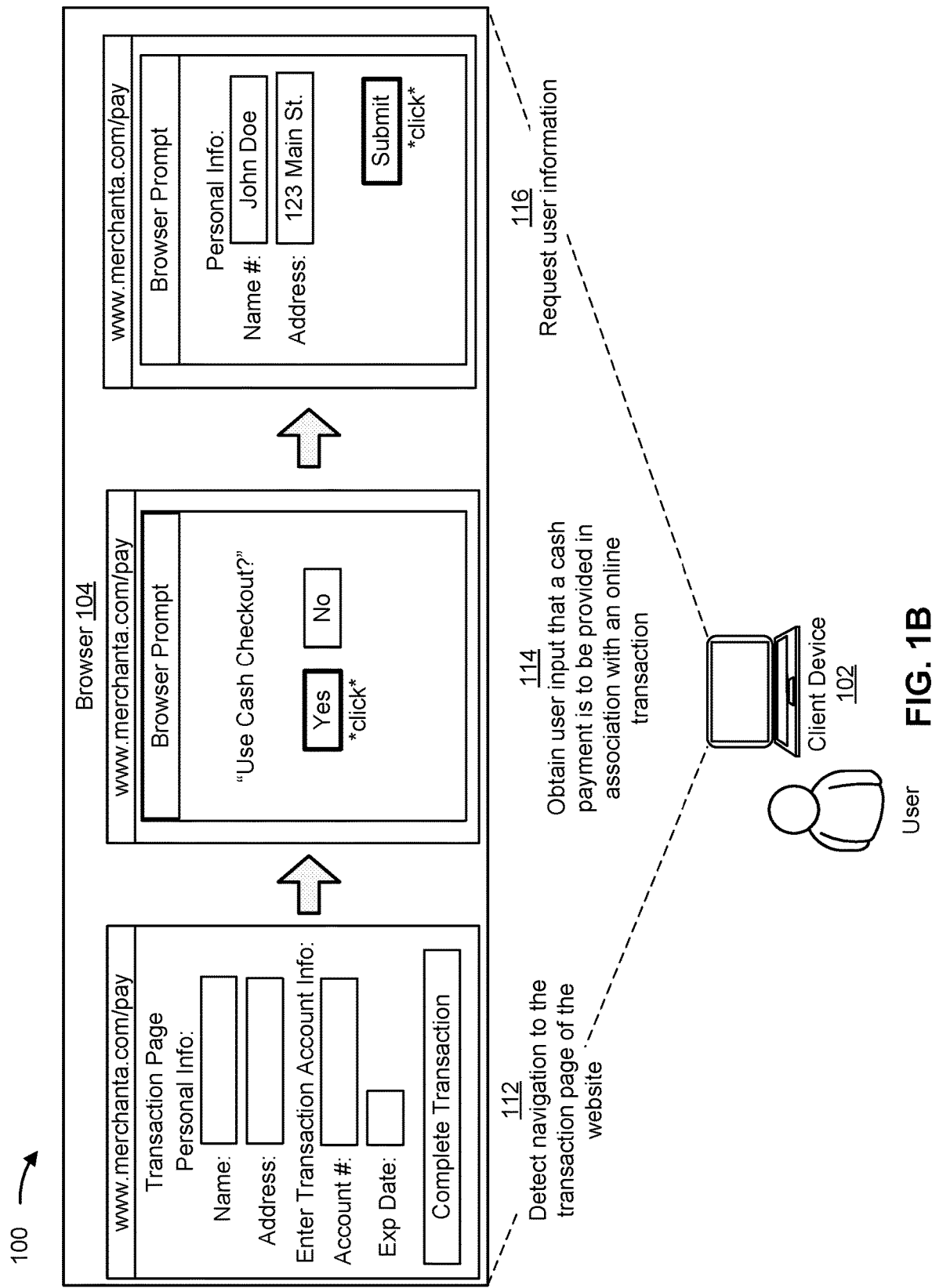
Figure 1C:
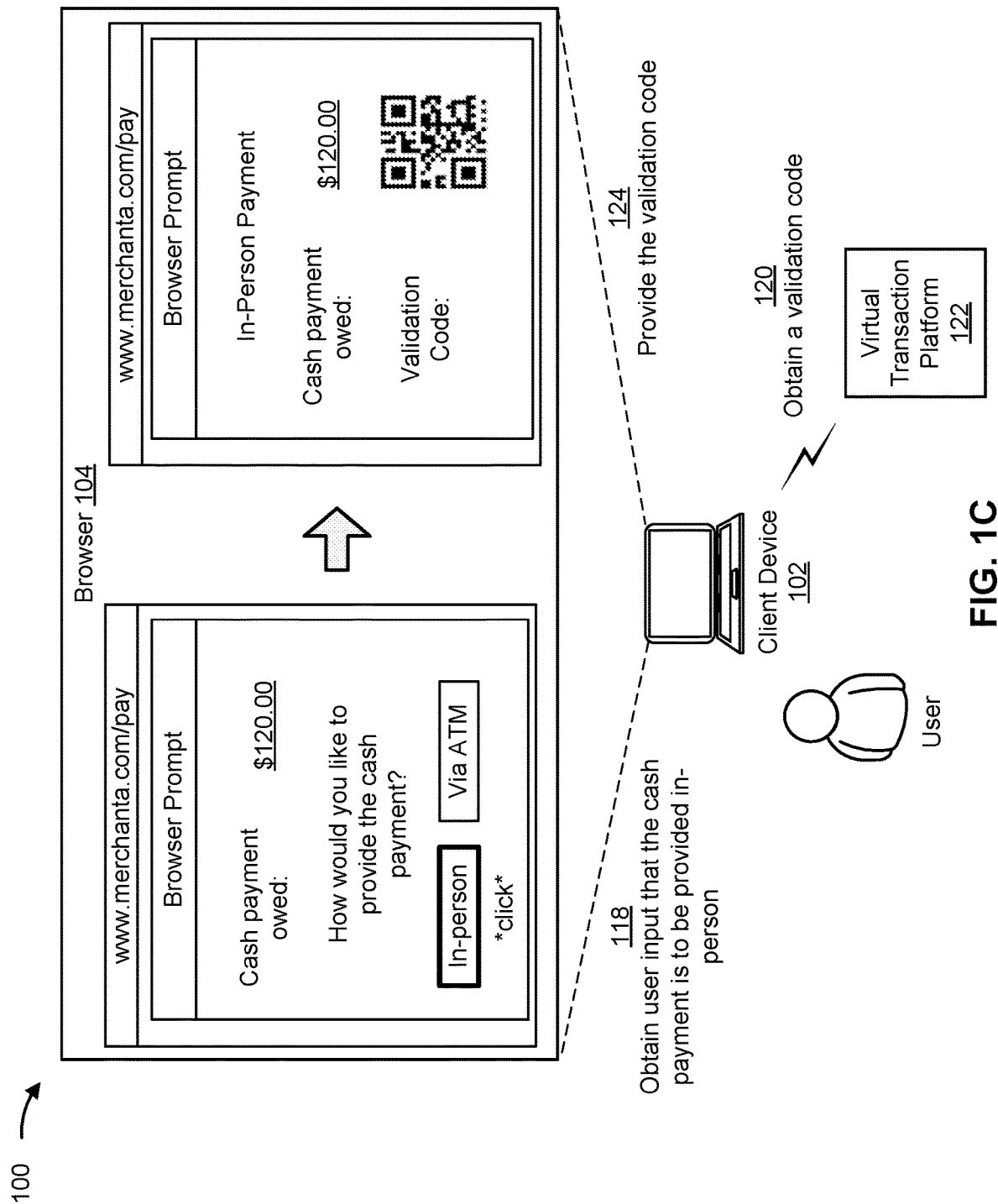
Figure 1D:
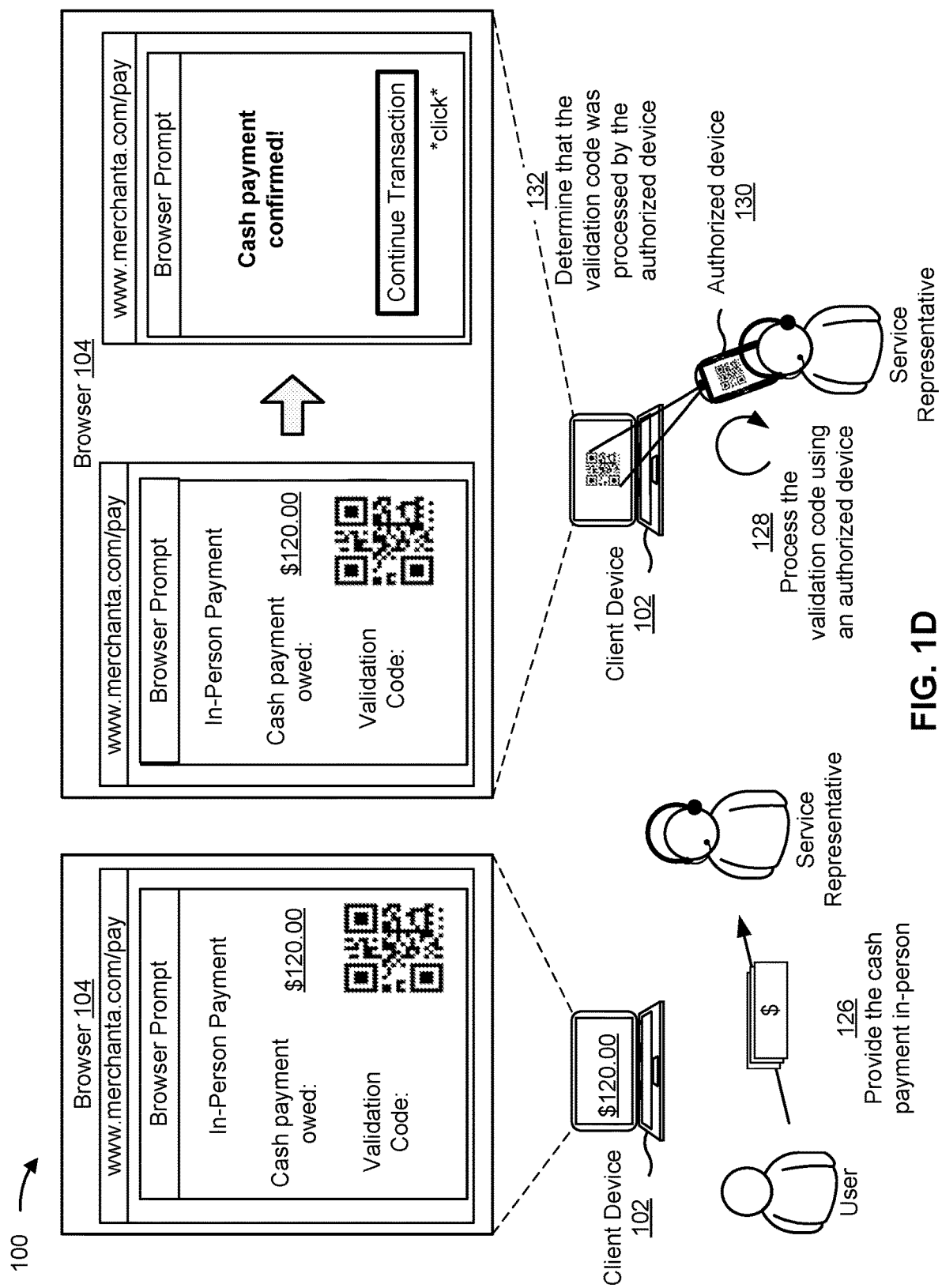
Figure 1E:
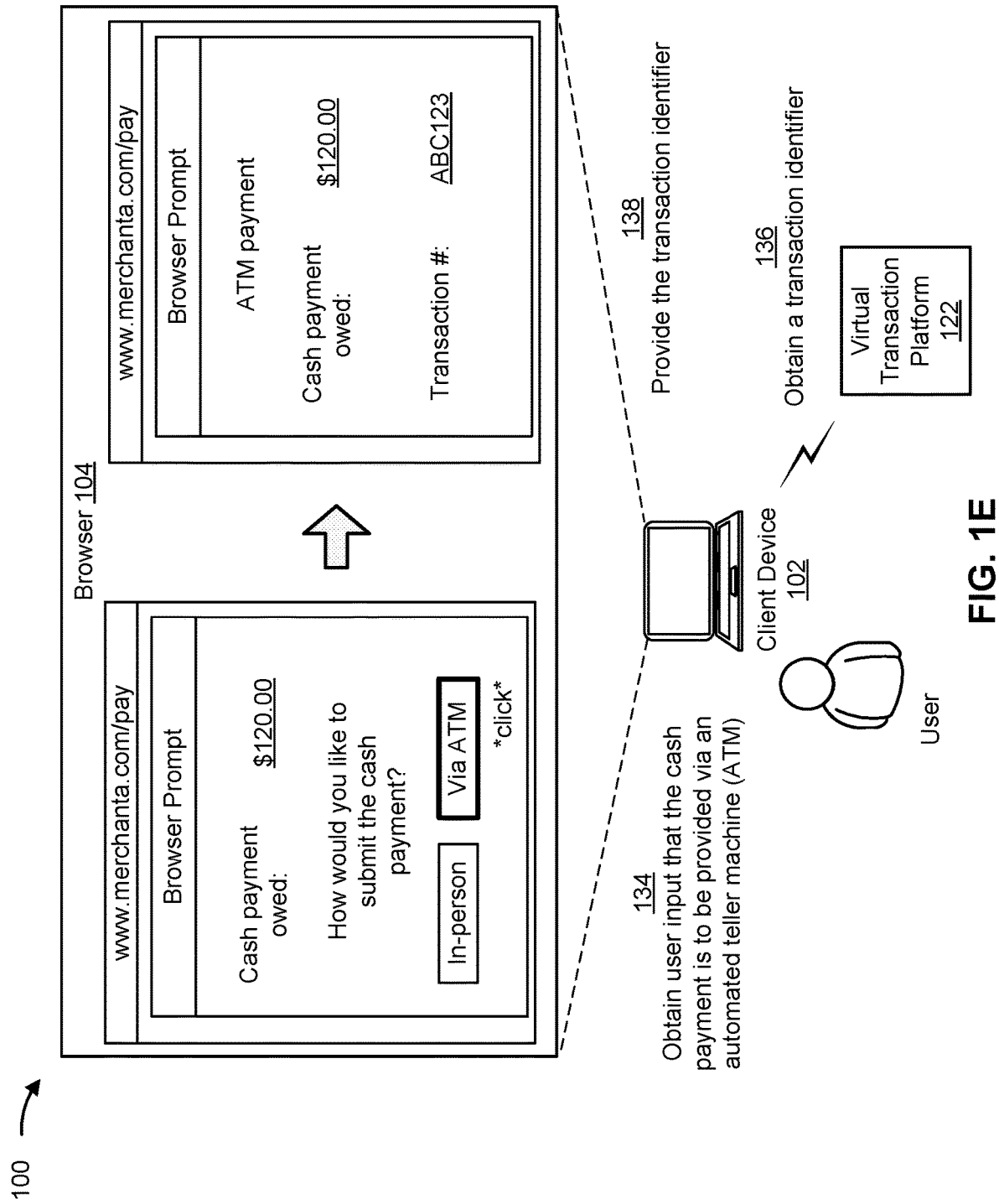
Figure 1F:
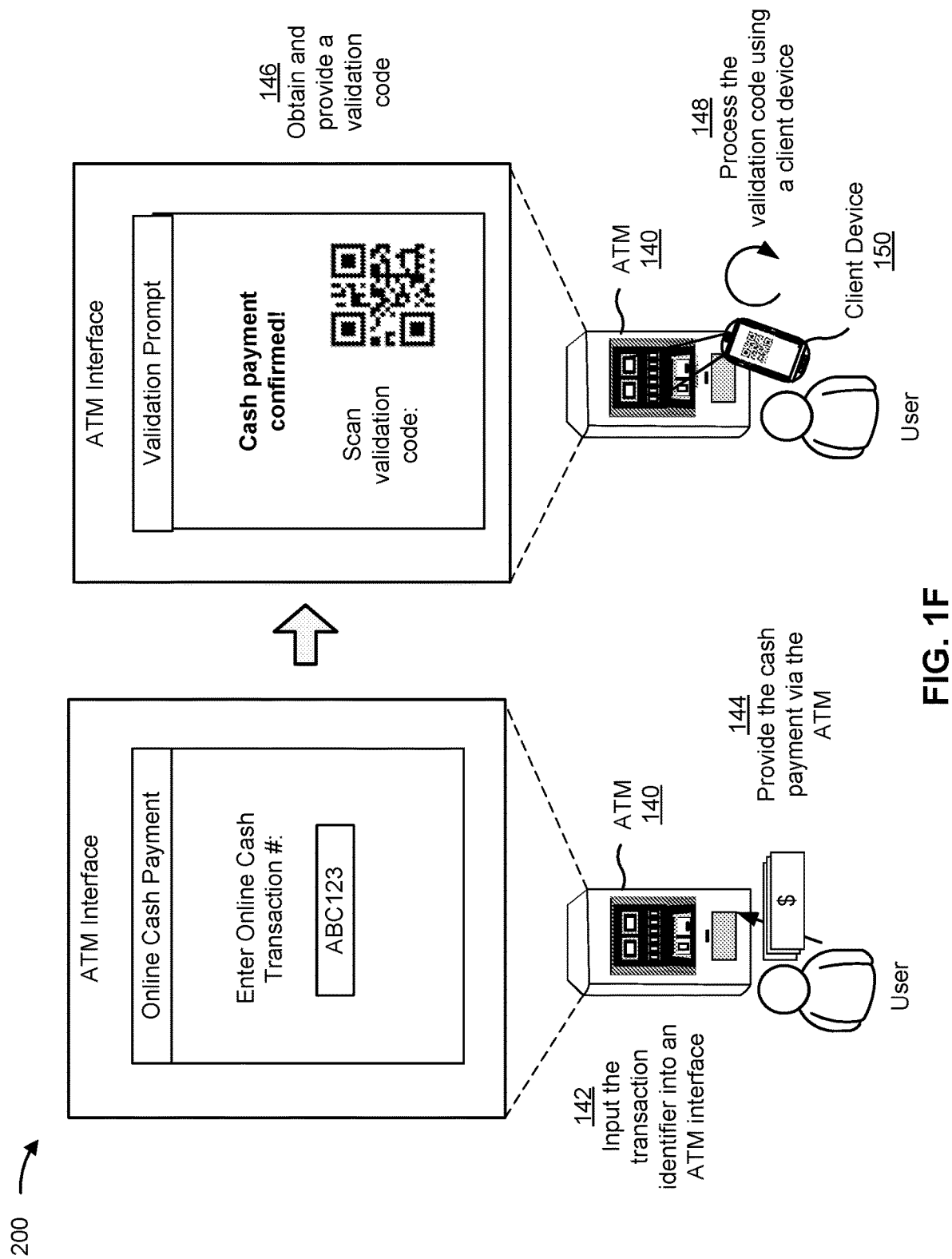
Figure 1G:
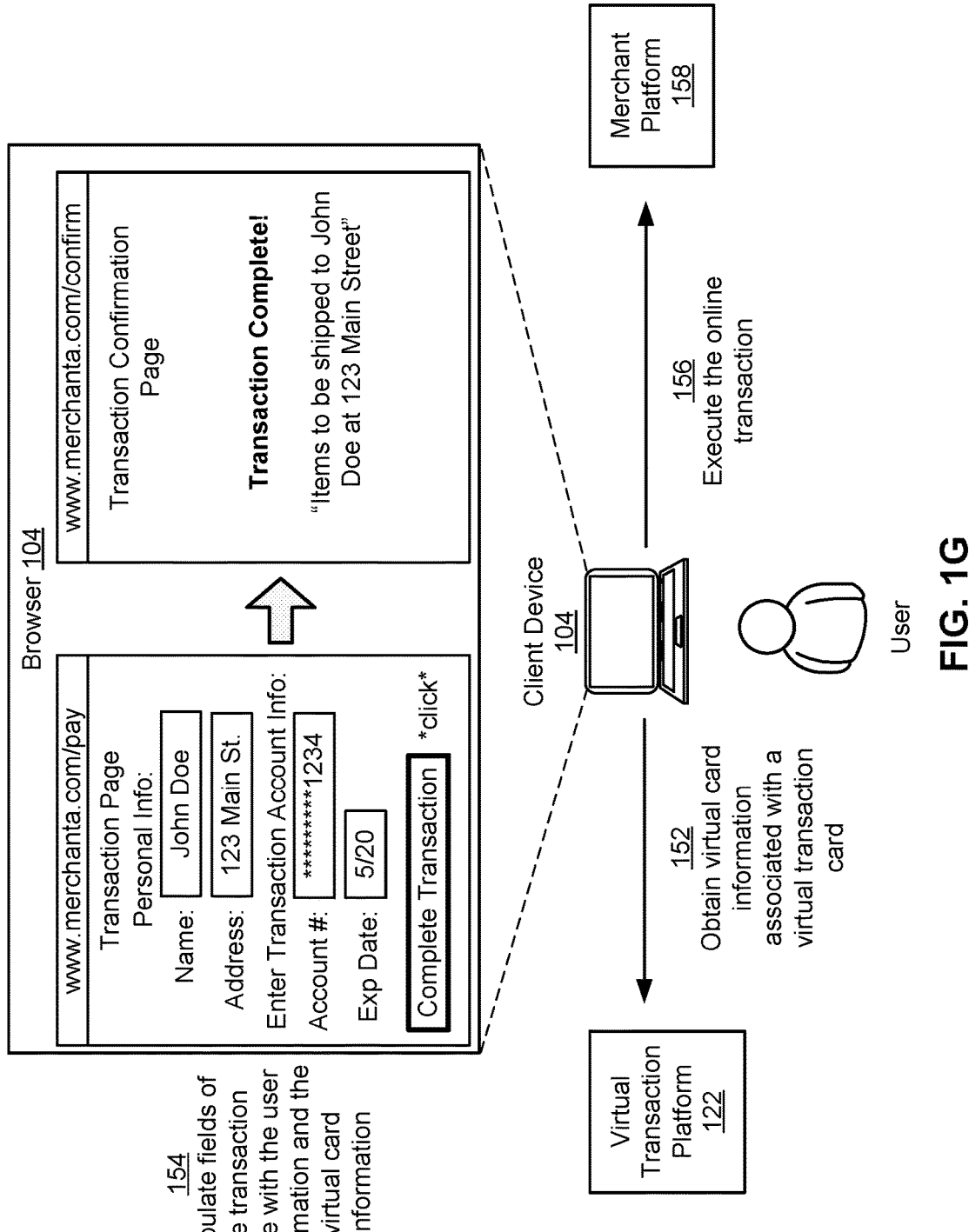

FIGS. 1A-1G are diagrams of one or more example implementations 100 described herein. FIGS. 1A-1B illustrate a browser extension on a client device 102 interacting with a browser 104 to display a cash payment option for an online transaction. FIGS. 1C-1D illustrate, as one example of providing a cash payment, a user associated with the client device 102 providing the cash payment in-person. FIGS. 1E-1F illustrate, as another example of providing the cash payment, the user associated with the client device 102 providing the cash payment via an automated teller machine (ATM). FIG. 1G illustrates the browser extension obtaining virtual card information and executing the online transaction with the virtual card information.

In FIGS. 1A-1G, assume that the browser 104 installed on the client device 102, by default, requires users to input transaction account information to conduct online transactions (e.g., to purchase goods and/or services, to rent goods and/or services, and/or the like). Assume further that the user associated with the client device 102 does not have, or does not wish to use, a transaction account (e.g., a bank account, a credit card account, a debit card account, and/or the like) but nonetheless wishes to conduct an online transaction using the browser 104.

In some implementations, as will be described below in connection with FIGS. 1E-1F, the user associated with the client device 102 may own or otherwise be authorized to configure the client device 102. To conduct online transactions, the user may have installed, on the client device 102, a browser extension that expands functionality of the browser 104 to permit cash payments for the online transactions.

In some implementations, as will be described below in connection with FIGS. 1C-1D, the client device 102 may be a publicly-accessible client device operated by a third party entity (e.g., a financial institution and/or the like). An administrator associated with the third party entity may have installed the browser extension on the client device 102 to be utilized by users (e.g., guests of the third party entity, customers of the third party entity, and/or the like). In such a case, the user associated with the client device 102 may have visited an establishment associated with the third party entity (e.g., a café, a bank, and/or the like) to use the client device 102 to conduct the online transaction.

In the description to follow, the browser extension will be described as performing actions relating to permitting cash payments for online transactions. It should be understood that a device on which the browser extension is installed and executing, such as the client device 102, may perform one or more or all of the actions and/or cause the browser extension to perform one or more or all of the actions.

As shown by reference number 106 in FIG. 1A, the browser extension, once installed on the client device 102, may configure the browser 104 to permit cash payments for online transactions. The browser extension may execute a script (e.g., code, which may be written in JavaScript, and/or the like) to perform operations in association with the browser 104, websites accessed by and/or rendered by the browser 104, and/or the like. The script may be executed based on user input (e.g., clicking a button or otherwise interacting with a user input component), may be automatically executed (e.g., based on a determination that one or more conditions are satisfied), and/or the like.

To conduct the online transaction, the user associated with the client device 102 may begin a browser session by opening the browser 104 (e.g., by clicking an icon associated with the browser 104, and/or the like). Based on the user opening the browser 104, and as shown by reference number 108, the browser extension may automatically execute and monitor the browser session of the browser 104 to determine whether the browser 104 should present a cash payment option. To monitor the browser session, the browser extension may utilize a front-end analysis (e.g., optical character recognition, and/or the like) and/or a back-end analysis (e.g., Hypertext Markup Language (HTML) code analysis, and/or the like) of one or more websites to identify one or more transaction indicators associated with online transactions. The one or more transaction indicators may include text that identifies an online transaction, a field that is associated with receiving information for an online transaction, an executable object that is associated with executing an online transaction, and/or the like.

In some implementations, the browser extension may use one or more artificial intelligence techniques, such as machine learning, deep learning, and/or the like to identify one or more transaction indicators associated with online transactions. The browser extension may use a model to identify one or more transaction indicators that may be used to predict whether a page of a website is a transaction page. For example, a platform associated with the browser extension (e.g., a virtual transaction platform 122, which is described below in connection with FIGS. 1C, 1E, and 1G) may train the model using historical data, such as historical data relating to websites (also referred to herein as website parameters) (e.g., a type of website, an architecture of the website, one or more objects associated with a transaction page of the website, text associated with the transaction page of the website, and/or the like); historical data relating to identifying transaction pages of websites (e.g., whether a page of a website was identified as a transaction page, whether a prompt was presented in association with identifying the page as the transaction page, and/or the like); historical data relating to results of identifying the transaction pages of the websites (e.g., whether the prompt resulted in confirmation that the page of the website was the transaction page, and/or the like); and/or the like.

In some implementations, the platform may perform a training operation when generating the model. For example, the platform may portion the historical data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the platform may preprocess and/or perform dimensionality reduction to reduce the historical data to a minimum feature set. In some implementations, the platform may train the model on this minimum feature set, thereby reducing processing to train the machine learning model, and may apply a classification technique, to the minimum feature set.

In some implementations, platform may use a classification technique, such as a logistic regression classification technique, a random forest classification technique, a gradient boosting machine learning (GBM) technique, and/or the like, to determine a categorical outcome (e.g., that a page of a website is transaction page of the website, that the page of the website is not a transaction page of the website, and/or the like). Additionally, or alternatively, the platform may use a naïve Bayesian classifier technique. In this case, the platform may perform binary recursive partitioning to split the historical data of the minimum feature set into partitions and/or branches and use the partitions and/or branches to perform predictions (e.g., that a page of a website is a transaction page). Based on using recursive partitioning, the platform may reduce utilization of computing resources relative to manual, linear sorting and analysis of data items, thereby enabling use of thousands, millions, or billions of data items to train a model, which may result in a more accurate model than using fewer data items.

The platform may provide the model for use by the browser extension. The browser extension may use the model to identify one or more transaction indicators that may be used to predict whether a page of a website is a transaction page, as described below.

In this case, after opening the browser 104, the user may navigate the browser to a website 110 associated with an online provider of goods and/or services (e.g. a retailer, a rental service, a restaurant, a grocery store, and/or the like). For example, the user may enter a uniform resource locator (URL) associated with the website 110 into an address bar of the browser 104, may enter a name of the online provider into a search engine, and/or the like. The user may access different pages of the website 110 to purchase and/or rent at least one item of the goods and/or services. The user may access the different pages by clicking one or more buttons and/or one or more hyperlinks on one or more pages of the website 110, by inputting a search query into a search interface of the website 110, and/or the like.

For example, the website 110 may have a URL of "www-.merchanta.com" and may be associated with an online merchant, such as "Merchant A." The user may access pages associated with accessories, outerwear, and/or the like (e.g., by clicking a "Shop" button, followed by one or more categorical hyperlinks, and/or the like). On respective accessories and outerwear pages of the website 110, the user may add a hat and a coat to an online cart (e.g., by clicking a "Cart" button). A page associated with the online cart may display information, such as information identifying the hat, the coat, corresponding costs of the hat and the coat, a total cost, and/or the like. To complete the online transaction (e.g., by purchasing the hat and the coat), the user may proceed to a transaction page of the website 110 (e.g., by clicking a "Checkout" button).

As shown by reference number 112 in FIG. 1B, the browser extension may detect navigation to the transaction page of the website 110, which may be configured to facilitate the online transaction. To detect that the user navigated the browser 104 to the transaction page, the browser extension may detect that the transaction page includes a transaction indicator, such as text that identifies the online transaction (e.g., "shopping cart," "items in cart," and/or the like), a field that is associated with receiving information for the online transaction (e.g., an account number field, a shipping address field, a billing address field, and/or the like), an executable object that is associated with executing the online transaction (e.g., a shopping cart button, a checkout button, and/or the like), and/or the like. For example, as illustrated in FIG. 1B, the browser extension may detect the navigation to the transaction page based on the term "transaction," the fields of "address," "account number," and "expiration date," the "Complete Transaction" button, and/or the like. In some implementations, the browser extension may use the model to detect that the user navigated the browser 104 to the transaction page. For example, the browser extension may input, into the model, data relating to one more website parameters of the website 110, and the model may output data relating to one or more transaction indicators that may be used to predict whether a page of the website 110 is a transaction page.

Based on detecting the navigation to the transaction page, the browser extension may present an option for cash payment on a user interface of the browser 104. For example, the browser extension may request the user to indicate, via a dialog box on the user interface, and/or the like, whether a cash payment is to be provided in association with the online transaction. In some implementations, the browser extension may overlay the dialog box on top of the transaction page, replace the transaction page with a page containing the dialog box, and/or the like).

Based on the request, and as shown by reference number 114, the browser extension may obtain user input that the cash payment is to be provided in association with the online transaction. For example, as shown in FIG. 1B, the user associated with the client device 102 may select "Yes," when prompted with the question, "Use Cash Checkout?" By responding negatively, the user may cause the browser extension to restore the transaction page so that the user can complete the online transaction using a transaction account. By responding affirmatively, the user may cause the browser extension to activate a cash payment mode, which allows the user to complete the online transaction using a cash payment.

In some implementations, the browser extension may be configured to automatically (e.g., without the user input) activate the cash payment mode upon detecting navigation to a transaction page. In this case, the browser extension may conserve resources (e.g., networking resources, computing resources, and/or the like) that might otherwise be consumed communicating with users to obtain user input. In some implementations, the browser extension may be configured to allow users to request activation of the cash payment mode, regardless of whether the browser extension detects navigation to a transaction page. In this case, the browser extension may conserve resources (e.g., networking resources, computing resources, and/or the like) that might have otherwise been consumed monitoring websites to detect one or more transaction identifiers.

As shown by reference number 116, based on the browser extension activating the cash payment mode, the browser extension may request user information associated with the user. The browser extension may request the user information to populate user information fields of the website 110, to identify the user, to arrange shipment of one or more items to the user, and/or the like. For example, the user information may include a name of the user, a shipping address of the user, an email address of the user, a phone number of the user, and/or the like. In some implementations, to allow the user to maintain anonymity, the user information may include anonymous information that is unassociated with the user. The anonymous information may include, for example, a name that is unassociated with the user, an address that is unassociated with the user, an email address that is unassociated with the user, a phone number that is unassociated with the user, other text that is unassociated with the user, and/or the like. In some implementations, the browser extension may display an option for in-person pickup of one or more items (e.g., at an establishment associated with the online provider, at an establishment associated with the third party entity, and/or the like). In the example shown in FIG. 1B, the browser extension may request, and the user may input and submit, a name and address of the user.

In some implementations, the browser extension may not request the user information. For example, the browser extension may have obtained and/or stored the user information associated with the user based on input of the user information into the transaction page, based on input of the user information during a previous browser session, and/or the like. As another example, to allow the user to remain anonymous when completing the online transaction, the browser extension may generate the anonymous information to populate the user information fields in a manner unassociated with the user, which will be discussed in connection with FIG. 1G.

The browser extension may present multiple options for providing the cash payment on the user interface of the browser 104. The browser extension may present the multiple options based on the browser extension receiving the user information associated with the user, based on the browser extension obtaining the user input that the cash payment is to be provided, and/or the like. For example, the browser extension may request the user to indicate, via a dialog box on the user interface and/or the like, whether the cash payment is to be provided in-person or via an ATM. Based on the request, and as shown by reference number 118 in FIG. 1C, the browser extension may obtain user input that the cash payment is to be provided in-person. For example, as discussed above, the client device 102 may be a publicly-accessible device located at an establishment (e.g., a café, a bank, and/or the like) associated with a third party entity (e.g., a financial institution, and/or the like). In such a case, the user associated with the client device 102 may wish to complete the online transaction at the establishment. Thus, the user may select "In-Person," when prompted with the question "How would you like to provide the payment?" By making the selection, the user may cause the browser extension to seek to validate the cash payment.

In some implementations, the browser extension may be configured to permit only in-person payment, only payment via ATM, and/or the like. In such cases, the browser extension may conserve resources (e.g., networking resources, computing resources, and/or the like) that might have otherwise been consumed communicating with users to obtain user input. In some implementations, the browser extension may present the multiple options for providing the cash payment during an initial configuration process during installation on the client device 102. In such a case, for example, a user installing the browser extension on a personal client device may configure the browser extension to permit only payment via ATM. As another example, an administrator associated with a third party entity and installing the browser extension on a publicly-accessible client device may configure the browser extension to permit only in-person payment. In such cases, the browser extension may conserve resources (e.g., networking resources, computing resources, and/or the like) that might have otherwise been consumed communicating with users to obtain repeated user input for every online transaction.

As shown by reference number 120, the browser extension may obtain a validation code to validate the cash payment. The browser extension may obtain the validation code based on the browser extension obtaining the user input that the cash payment is to be provided in-person, based on the browser extension receiving the user information associated with the user, and/or the like. The validation code may include a linear barcode (e.g., a universal product code, and/or the like), a matrix barcode (e.g., a quick release (QR) code), an encrypted string of characters, an unencrypted string of characters, and/or the like. To obtain the validation code, the browser extension may send, to the virtual transaction platform 122, a request to generate and provide the validation code. The request may include information associated with the online transaction. For example, the information may include user information associated with the user, identifiers and/or descriptions of one or more items being purchased and/or rented, costs of the one or more items being purchased and/or rented, a transaction identifier, the URL of the website, a name of the online provider of goods and/or services, a time of access of the website, a combination of the foregoing, and/or the like. Based on the request, the virtual transaction platform 122 may generate the validation code. For example, the virtual transaction platform 122 may generate the validation code by encrypting the information associated with the online transaction in an arrangement of geometrical shapes (e.g., rectangles, dots, and/or the like) and spaces, in a string of characters, and/or the like. As another example, the virtual transaction platform 122 may generate the validation code by randomly generating an unencrypted string of characters, and/or the like. To complete the request, the virtual transaction platform 122 may send the validation code to the browser extension.

In some implementations, the browser extension may obtain the validation code by generating the validation code. Similar to that described above, the browser extension may generate the validation code by encrypting the information associated with the online transaction, by randomly generating an unencrypted string of characters, and/or the like. In such a case, the browser extension may conserve resources that would have otherwise been consumed communicating with the virtual transaction platform 122 to obtain the validation code.

Based on receiving or generating the validation code, and as shown by reference number 124, the browser extension may provide the validation code to be processed. For example, as shown in FIG. 1C, the browser extension may present the validation code via the user interface along with a value associated with the cash payment (e.g., $120.00). Additionally, or alternatively, the user interface may provide instructions and/or an explanation to the user to facilitate processing of the validation code. For example, the user interface may instruct the user to provide the cash payment to a service representative associated with the third party entity (e.g., at an identified establishment, at one of multiple identified establishments, and/or the like), as will be described in connection with FIG. 1D.

As shown by reference number 126 in FIG. 1D, the user associated with the client device 102 may provide the cash payment in-person to the service representative associated with the third party entity (e.g., the financial institution, and/or the like). The service representative may verify that an amount of the cash payment matches the value displayed on the user interface. After verifying the amount, and as shown by reference number 128, the service representative may process the validation code using an authorized device 130 (e.g., a barcode scanner device, a smartphone having a barcode scanning application, and/or the like). To process the validation code, the service representative may scan the validation code with the authorized device 130 to decode the information associated with the online transaction that is stored therein. The authorized device 130 may display the information associated with the online transaction on an interface of the authorized device 130. After the service representative confirms the information displayed on the user interface (e.g., by clicking a button, entering in an alphanumeric code, and/or the like), the authorized device 130 may transmit a notification to the browser extension. The notification may indicate that the validation code was processed by the service representative in association with receiving the cash payment. In some implementations, to verify that the service representative is authorized to accept the cash payment and process the validation code, the notification may indicate information associated with credentials of the service representative (e.g., an employee identifier, and/or the like).

In some implementations, for example when the validation code is an unencrypted string of characters, the authorized device 130 may include an optical character recognition (OCR) device, a smart phone having an OCR application, and/or the like. To process the validation code, the service representative may scan the validation code with the authorized device 130 or input the validation code into the authorized device 130. Based on receiving the validation code, the authorized device 130 may generate and provide a confirmation code. The confirmation code may be an alphanumeric code, a numeric code, an alphabetic code, and/or the like. The authorized device 130 may provide the confirmation code by displaying the confirmation code on an interface of the authorized device 130, by printing the confirmation code on a receipt, by emailing or texting the confirmation code to a user device of the user, and/or the like. To continue the online transaction, the user, using the client device 102, may input the confirmation code into the interface of the browser extension.

Based on receiving the notification or the confirmation code, and as shown by reference number 132, the browser extension may determine that the validation code was processed by the authorized device 130. The browser extension may display a message that the cash payment has been confirmed. The user associated with the client device 102 may proceed to complete the online transaction (e.g., by clicking a "Continue Transaction" button, and/or the like), which will be described below in connection with FIG. 1G.

FIGS. 1E-1F illustrate an alternative scenario to that described with respect to FIGS. 1C-1D. Based on the browser extension requesting the user to indicate whether the cash payment is to be provided in-person or via an ATM, and as shown by reference number 134 in FIG. 1E, the browser extension may obtain user input that the cash payment is to be provided via an ATM. For example, as discussed above, the user may have accessed the client device 102 at a location other than an establishment associated with the third party entity (e.g., based on the client device 102 being a personal client device, and/or the like). As another example, the user may have accessed the client device 102 at an establishment associated with the third party entity but may have nonetheless wished to provide the cash payment via an ATM, rather than via a service representative. Thus, the user may select "Via ATM," when prompted with the question "How would you like to submit the cash payment?" By making the selection, similar to that described above, the user may cause the browser extension to seek to validate the cash payment.

As shown by reference number 136, the browser extension may obtain a transaction identifier for processing by an ATM. The transaction identifier may include an alphanumeric code, a numeric code, an alphabetic code, and/or the like. To obtain the transaction identifier, the browser extension may send, to the virtual transaction platform 122, a request to generate and provide the transaction identifier. The request may include a value associated with the cash payment (e.g., $120.00). Based on the request, the virtual transaction platform 122 may generate the transaction identifier (e.g., ABC123) and provide the transaction identifier and corresponding value to the third party entity for storage (e.g., in a data structure). To complete the request, the virtual transaction platform 122 may send the transaction identifier to the browser extension.

Based on receiving the transaction identifier, and as shown by reference number 138, the browser extension may provide the transaction identifier. For example, as shown in FIG. 1E, the browser extension may present the transaction identifier via the user interface along with the value associated with the cash payment. Additionally, or alternatively, the user interface may provide instructions and/or an explanation to the user to facilitate use of the transaction identifier. For example, the user interface may provide an instruction to the user to enter the transaction identifier into an ATM associated with the third party entity to provide the cash payment to the third party entity, as will be described in connection with FIG. 1F. In some implementations, the user interface may provide directions to one or more ATMs, may provide an address of one or more ATMs, and/or the like.

Based on the instruction, and as shown in FIG. 1F, the user may visit an ATM 140 to input the cash payment. As shown by reference number 142, the user may input the transaction identifier into an ATM interface of the ATM 140 (e.g., by typing in "ABC123"). After submitting the transaction identifier, the ATM 140 may search the data structure associated with the third party entity to determine the value of the cash payment owed by the user. In this case, based on the transaction identifier, the ATM 140 may determine that the user owes $120.00. As a result, the ATM 140 may display a request to the user to provide the cash payment.

Based on the request, and as shown by reference number 144, the user may provide the cash payment via the ATM 140 (e.g., by inserting the cash payment into a slot in the ATM 140). The ATM 140 may verify, via one or more sensors, that the cash payment corresponds to the value of the cash payment owed by the user. After verifying the cash payment, and as shown by reference number 146, the browser extension may obtain and provide a validation code. Similar to that described above with respect to FIG. 1C, the validation code may include a linear barcode (e.g., a universal product code, and/or the like), a matrix barcode (e.g., a quick release (QR) code), an encrypted string of characters, and/or the like. To obtain the validation code, the ATM 140 may send, to the virtual transaction platform 122, a request to generate and provide the validation code. The request may include information associated with the cash payment (e.g., a value of the cash payment, a time of receipt of the cash payment, and/or the like). Based on the request, the virtual transaction platform 122 may generate the validation code by encrypting the information associated with the cash payment in an arrangement of geometrical shapes (e.g., rectangles, dots, and/or the like) and spaces, in a string of characters, and/or the like. To complete the request, the virtual transaction platform 122 may send the validation code to the ATM 140.

Based on receiving the validation code, the browser extension may provide the validation code to be processed by the user. For example, as shown in FIG. 1F, the ATM 140 may present the validation code via the ATM interface along with a message confirming receipt of the cash payment. Additionally, or alternatively, the ATM interface may provide instructions and/or an explanation to the user to facilitate processing of the validation code. For example, the ATM interface may instruct the user to use a barcode scanning application to scan the validation code, and/or the like.

As shown by reference number 148, the user may process the validation code using a client device 150 (e.g., after installing or activating the barcode scanning application, and/or the like). To process the validation code, the user may scan the validation code with the client device 150 to decode the information associated with the cash payment that is stored therein. The client device 150 may display the information associated with the cash payment on an interface of the client device 150. After the user confirms the information displayed on the user interface (e.g., by clicking a button, entering in an alphanumeric code, and/or the like), the client device 150 may transmit a notification to the browser extension. The notification may indicate that the validation code was processed by the user in association with providing the cash payment. Based on receiving the notification, the browser extension may determine that the user provided the cash payment to the ATM 140.

In some implementations, the user may utilize the client device 102 to process the validation code. In some implementations, rather than obtaining and providing a validation code to be scanned by the user, the ATM 140 may generate and provide a confirmation code. The confirmation code may be an alphanumeric code, a numeric code, an alphabetic code, and/or the like. The ATM 140 may provide the confirmation code by displaying the confirmation code on the ATM interface, by printing the confirmation code on a receipt, and/or the like. To continue the online transaction, the user, using the client device 102, may input the confirmation code into the interface of the browser extension. Based on receiving the confirmation code, the browser extension may determine that the cash payment was provided to the ATM 140. The browser extension may display a message that the cash payment has been confirmed. The user associated with the client device 102 may proceed to complete the online transaction, which will be described below in connection with FIG. 1G.

As shown by reference number 152 in FIG. 1G, the browser extension may obtain virtual card information associated with a virtual transaction card to complete the online transaction. The virtual card information may include an identifier associated with the virtual transaction card, an expiration date associated with the virtual transaction card, a CVV associated with the virtual transaction card, and/or the like. The virtual transaction card may be linked to an account of the third party entity. To obtain the virtual card information, the browser extension may send, to the virtual transaction platform 122, a request to generate the virtual transaction card and provide the virtual card information associated therewith. Based on the request, the virtual transaction platform 122 may generate the virtual transaction card (e.g., by randomly generating the virtual card information). The virtual transaction card may be configured for a single use that involves the execution of the online transaction, may be limited to a specific time frame, may be limited to the value associated with the cash payment, and/or the like. To complete the request, the virtual transaction platform 122 may send the virtual card information to the browser extension for use in completing the online transaction.

Based on receiving the virtual card information, and as shown by reference number 154, the browser extension may populate fields of the transaction page with the user information and the virtual card information. For example, the browser extension may populate corresponding user information fields of the transaction page (e.g., "Name" and "Address") with the user information (e.g., "John Doe" and "123 Main St.") and populate corresponding transaction account information fields (e.g., "Account Number" and "Expiration Date") with the virtual card information (e.g., account number ending in "1234" and "5/20").

Once the user information and the virtual card information are input into the corresponding user information field and transaction account information fields, and as shown by reference number 156, the browser extension may complete the online transaction by executing an executable object of the transaction page (e.g., based on the user clicking a "Complete Transaction" button, and/or the like). To execute the transaction, the browser extension may transmit an instruction to an account associated with the virtual transaction card to transfer funds from the account to an account associated with the merchant platform 158. Based on receipt of the funds, the merchant platform 158 may send a confirmation email to the user and arrange for the hat and the coat to be provided to the user (e.g., via direct shipment to the user, via shipment to an establishment associated with the third party entity, via in-store pick-up, and/or the like).

In some implementations, the browser 104 and the browser extension may be accessible on an ATM. In such a case, a user associated with the ATM may utilize the ATM to complete the online transaction without assistance from a service representative, a separate client device, a separate authorized device, and/or the like. Thus, the browser extension may conserve resources (e.g., networking resources, computing resources, vehicle resources and/or the like) that might have otherwise been consumed traveling to different locations, using multiple devices to complete the transaction, and/or the like.

By permitting cash payments for online transactions, the browser extension may conserve computing and/or networking resources that an online provider might have otherwise consumed to create an in-house cash-based transaction system, to integrate the in-house cash-based transaction system into a website associated with the online provider, to become a member of a members-only cash-based transaction system, to implement the members-only cash-based transaction system, and/or the like. Additionally, the browser extension may conserve vehicle or other travel-related resources that users might have otherwise wasted traveling to brick-and-mortar providers to make cash payments.

As indicated above, FIGS. 1A-1G are provided as one or more examples. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
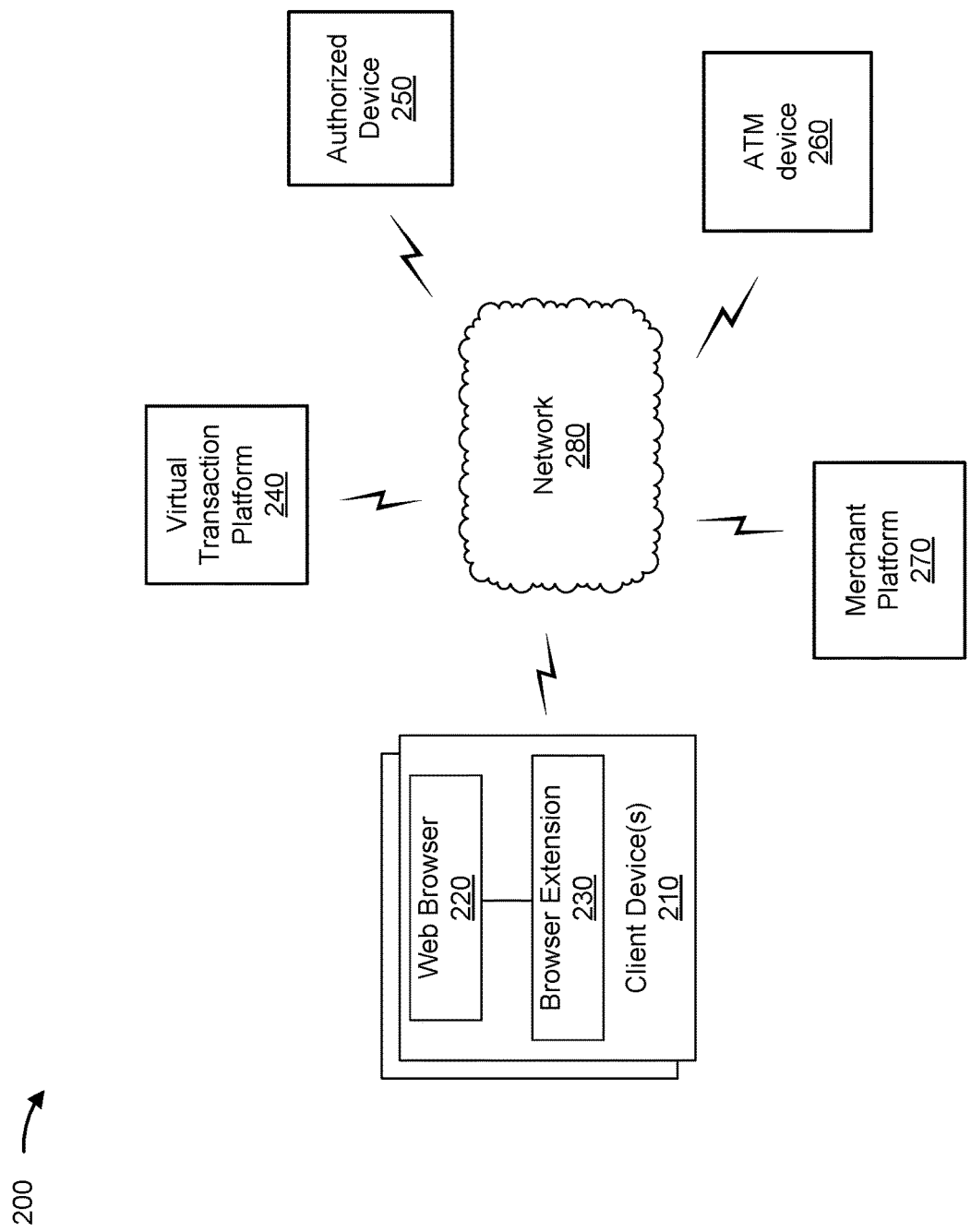
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210 (e.g., which may execute a web browser 220 and a browser extension 230), a virtual transaction platform 240, an authorized device 250, an ATM device 260, a merchant platform 270, and a network 280. Devices of environment 200 may interconnect via wired connections, wireless connections, or a combination of wired and wireless connections.

Client device(s) 210 include one or more devices that support web browsing. For example, client device 210 may include a computer (e.g., a desktop computer, a laptop computer, a tablet computer, a handheld computer, and/or the like), a mobile phone (e.g., a smart phone, and/or the like), a television (e.g., a smart television), an interactive display screen, and/or a similar type of device. Client device 210 may host a web browser 220 and/or a browser extension 230 installed on and/or executing on the client device 210. Client device 210 may correspond to the client device 102 and/or the client device 150, and the web browser 220 may correspond to browser 104.

Web browser 220 includes an application, executing on client device 210, that supports web browsing. For example, web browser 220 may be used to access information on the world wide web, such as web pages, images, videos, and/or other web resources. Web browser 220 may access such web resources using a uniform resource identifier (URI), such as a URL, a uniform resource name (URN), and/or the like. Web browser 220 may enable client device 210 to access and present, for display, content of a web page.

Browser extension 230 includes an application, executing on client device 210, capable of extending or enhancing functionality of web browser 220. For example, browser extension 230 may be a plug-in application for web browser 220. Browser extension 230 may be capable of executing one or more scripts (e.g., code, which may be written in a scripting language, such as Javascript, and/or the like) to perform an operation in associated with the web browser 220.

Virtual transaction platform 240 includes one or more devices capable of receiving, generating, storing, processing, and/or providing information associated with enabling a cash payment for an online transaction. For example, virtual transaction platform 240 may include a server device (e.g., a host server, a web server, an application server, and/or the like), a data center device, or a similar device. In some implementations, virtual transaction platform 240 may be hosted in a cloud computing environment. Virtual transaction platform 240, which may correspond to virtual transaction platform 122, may train and generate a model to predict one or more transaction indicators and may generate and provide validation codes, transaction identifiers, virtual transaction cards, and/or the like.

Authorized device 250 includes a device capable of receiving, generating, storing, processing, and/or providing information associated with verifying a cash payment. For example, authorized device 250 may include a computer (e.g., a desktop computer, a laptop computer, a tablet computer, a handheld computer, and/or the like), a mobile phone (e.g., a smart phone, and/or the like), a scanner device, a television (e.g., a smart television), an interactive display screen, and/or the like. Authorized device 250, which may correspond to the authorized device 130, may communicate with client device 210 to process validation codes and verify cash payments.

ATM device 260 includes a device capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit card account, and/or the like), and/or the like. For example, ATM device 260 may include an ATM, an automated banking machine (ABM), a cash point, a cash machine, a cash dispenser, and/or the like. ATM device 260, which may correspond to the ATM 140, may receive and verify cash payments in association with online transactions.

Merchant platform 270 includes one or more devices capable of receiving, generating, storing, processing, and/or providing information associated with executing an online transaction. For example, merchant platform 270 may include a server device (e.g., a host server, a web server, an application server, and/or the like), a data center device, or a similar device. In some implementations, merchant platform 270 may be hosted in a cloud computing environment. Merchant platform 270, which may correspond to the merchant platform 158, may receive, process, and provide information associated with completing an online transaction (e.g., by arranging for purchased goods and/or services to be provided to a user, and/or the like).

Network 280 includes one or more wire and/or wireless networks. For example, network 290 may include a cellular network (e.g., a long-term evolution (LTE) network, a code division multiple access (CDMA) network, a third generation (3G) network, a fourth generation (4G) network, a fifth generation (5G) network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
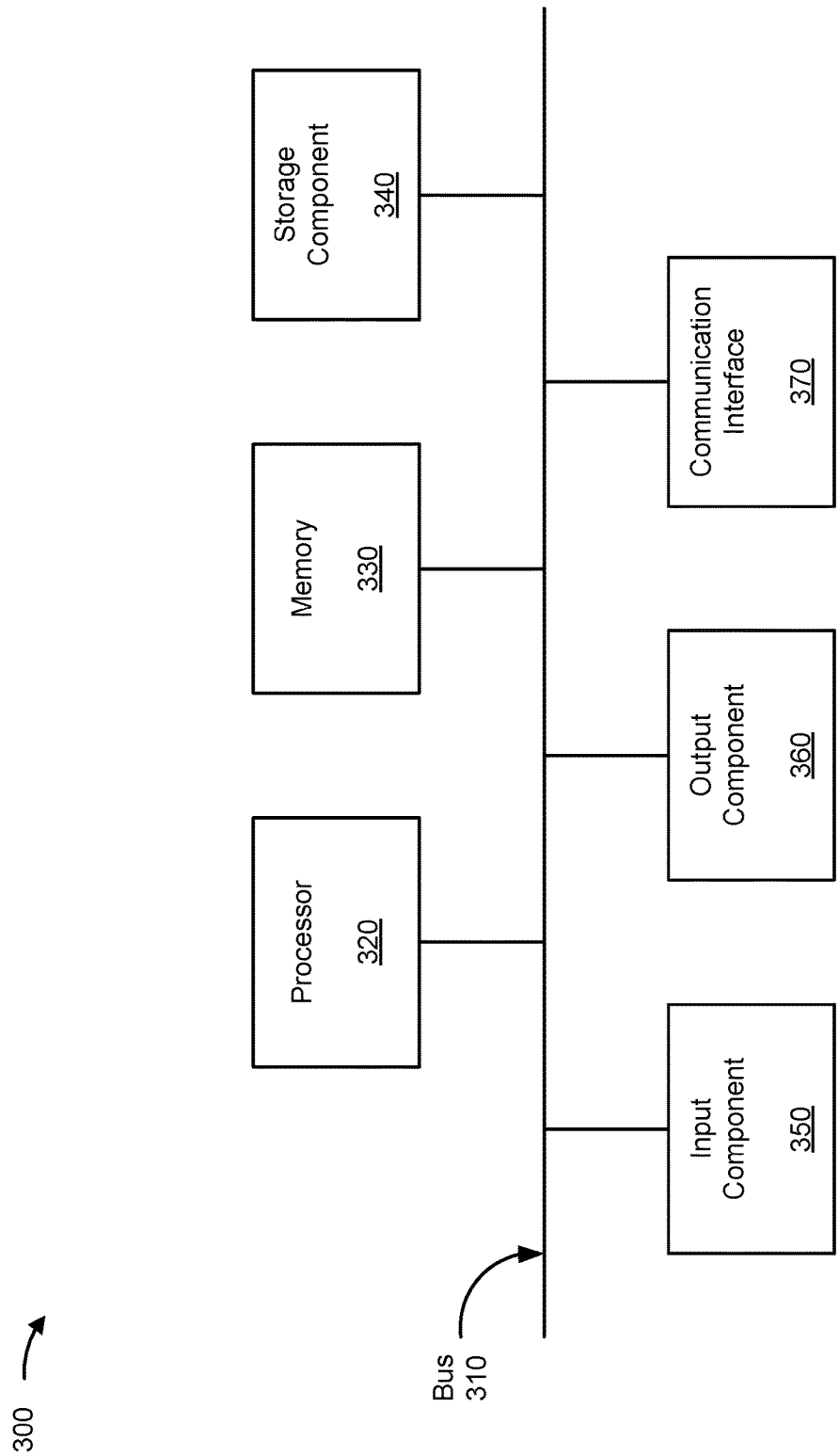
FIG. 3 is a diagram of example components of one or more devices of FIG. 2.

FIG. 3 is a diagram of example components of a device 300, which may correspond to client device 210, virtual transaction platform 240, authorized device 250, ATM device 260, and/or merchant platform 270. In some implementations, client device 210, virtual transaction platform 240, authorized device 250, ATM device 260, and/or merchant platform 270 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
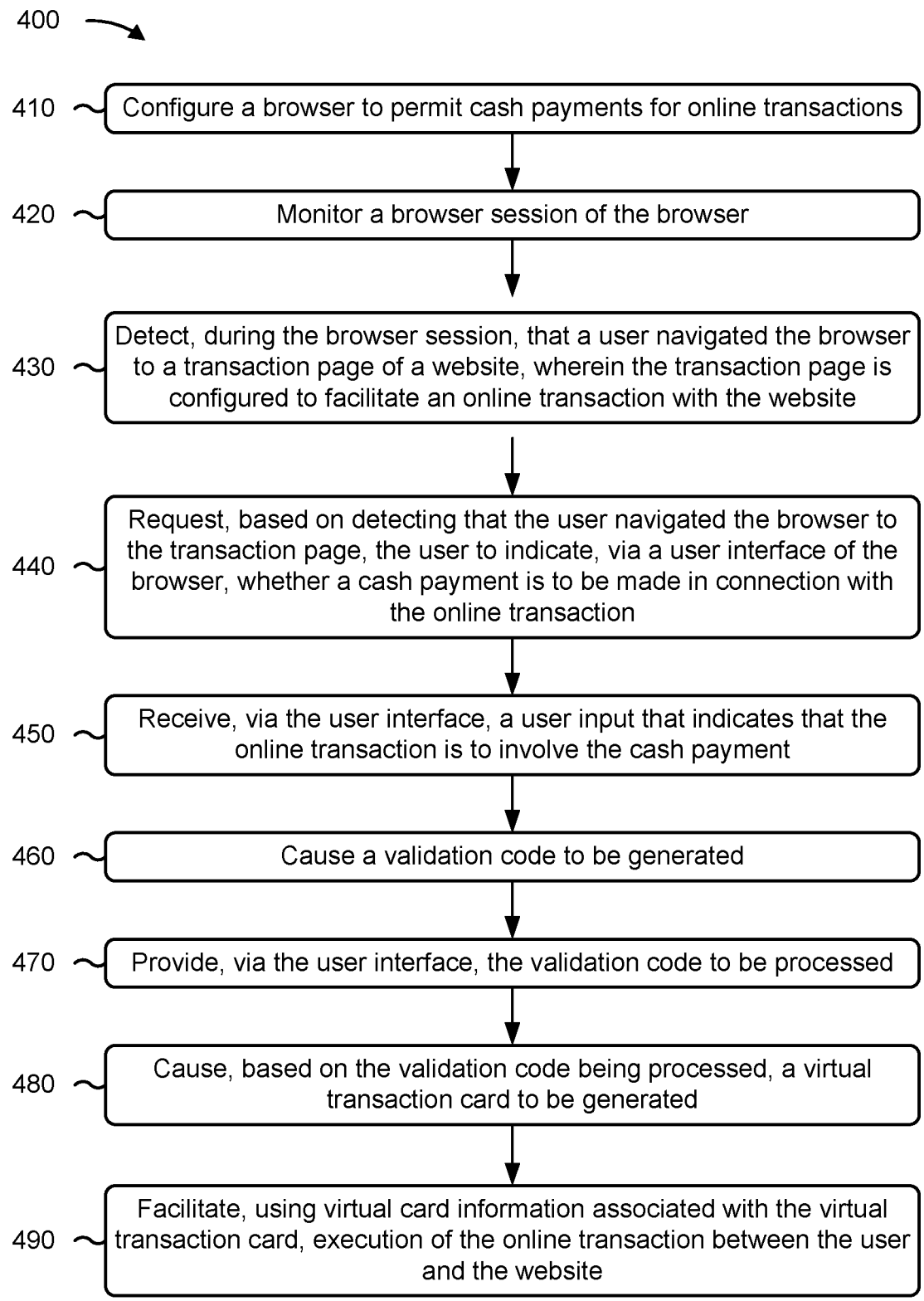
FIGS. 4-6 are flow charts of example processes relating to a transaction platform that permits cash payments for online transactions.

FIG. 4 is a flow chart of an example process 400 associated with permitting cash payments for online transactions. In some implementations, one or more process blocks of FIG. 4 may be performed by a device (e.g., client device 210 executing a browser extension 230, client device 102 executing the browser extension, and/or the like). In some implementations, one or more process blocks of FIG. 4 may be performed by another device or a group of devices separate from or including the device, such as a virtual transaction platform (e.g., virtual transaction platform 122, virtual transaction platform 240), authorized device (e.g., authorized device 130, authorized device 250), ATM device (e.g., ATM 140, ATM device 260), merchant platform (e.g., merchant platform 158, merchant platform 270), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include configuring a browser to permit cash payments for online transactions (block 410). For example, the device may configure a browser to permit cash payments for online transactions, as described above.

As further shown in FIG. 4, process 400 may include monitoring a browser session of the browser (block 420). For example, the device may monitor a browser session of the browser, as described above.

As further shown in FIG. 4, process 400 may include detecting, during the browser session, that a user navigated the browser to a transaction page of a website, wherein the transaction page is configured to facilitate an online transaction with the website (block 430). For example, the device may detect, during the browser session, that a user navigated the browser to a transaction page of a website, as described above. In some implementations, the transaction page is configured to facilitate an online transaction with the website.

As further shown in FIG. 4, process 400 may include requesting, based on detecting that the user navigated the browser to the transaction page, the user to indicate, via a user interface of the browser, whether a cash payment is to be made in connection with the online transaction (block 440). For example, the device may request, based on detecting that the user navigated the browser to the transaction page, the user to indicate, via a user interface of the browser, whether a cash payment is to be made in connection with the online transaction, as described above.

As further shown in FIG. 4, process 400 may include receiving, via the user interface, a user input that indicates that the online transaction is to involve the cash payment (block 450). For example, the device may receive, via the user interface, a user input that indicates that the online transaction is to involve the cash payment, as described above.

As further shown in FIG. 4, process 400 may include causing a validation code to be generated (block 460). For example, the device may cause a validation code to be generated, as described above.

As further shown in FIG. 4, process 400 may include providing, via the user interface, the validation code to be processed (block 470). For example, the device may provide, via the user interface, the validation code to be processed, as described above.

As further shown in FIG. 4, process 400 may include causing, based on the validation code being processed, a virtual transaction card to be generated (block 480). For example, the device may cause, based on the validation code being processed, a virtual transaction card to be generated, as described above.

As further shown in FIG. 4, process 400 may include facilitating, using virtual card information associated with the virtual transaction card, execution of the online transaction between the user and the website (block 490). For example, the device may facilitate, using virtual card information associated with the virtual transaction card, execution of the online transaction between the user and the website, as described above.

Process 400 may include additional implementations, such as any single implementation or any combination of implementations described below and/or in connection with one or more other processes described elsewhere herein.

In a first implementation, configuring the browser may comprise causing the browser to include a browser extension that is configured to permit the cash payments, the user interface is associated with the browser extension.

In a second implementation, alone or in combination with the first implementation, the user interface may comprise a dialog box of the browser that is configured to permit the user to provide the user input.

In a third implementation, alone or in combination with one or more of the first and second implementations, causing the validation code to be generated may comprise: requesting a virtual transaction platform to generate the validation code to be processed by an authorized device, and receiving, from the virtual transaction platform, the validation code.

In a fourth implementation, alone or in combination with one or more of the first through third implementations, providing the validation code may comprise: presenting the validation code via the user interface to permit the authorized device to process the validation code.

In a fifth implementation, alone or in combination with one or more of the first through fourth implementations, the authorized device may be associated with a service representative of a third party entity that is associated with the virtual transaction platform.

In a sixth implementation, alone or in combination with one or more of the first through fifth implementations, the validation code may comprise a barcode to be scanned by an authorized device, and the validation code may be processed based on the barcode being scanned by the authorized device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
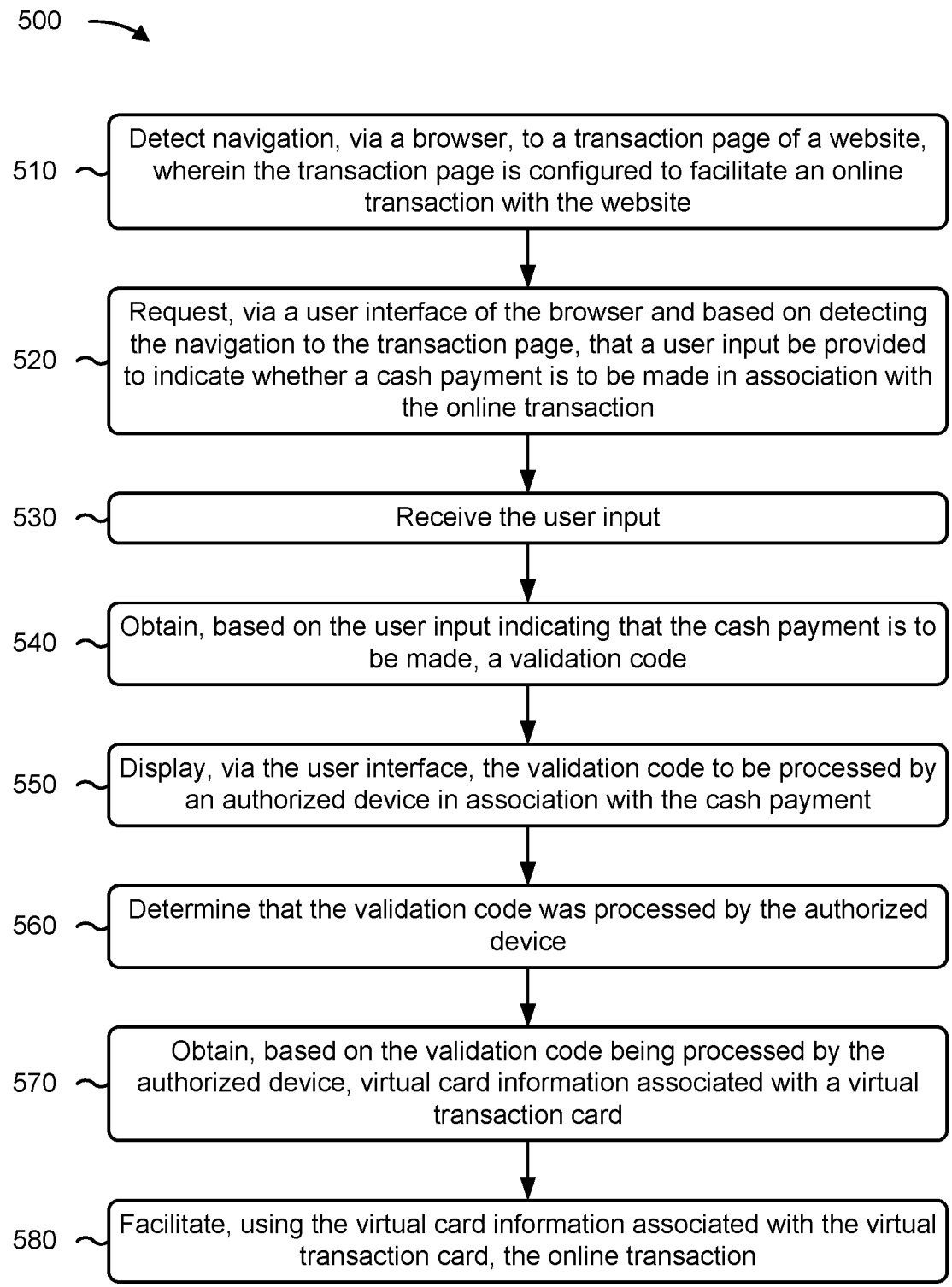

FIG. 5 is a flow chart of an example process 500 associated with permitting cash payments for online transactions. In some implementations, one or more process blocks of FIG. 5 may be performed by a device (e.g., client device 210 executing a browser extension 230, client device 102 executing the browser extension, and/or the like). In some implementations, one or more process blocks of FIG. 5 may be performed by another device or a group of devices separate from or including the device, such as a virtual transaction platform (e.g., virtual transaction platform 122, virtual transaction platform 240), authorized device (e.g., authorized device 130, authorized device 250), ATM device (e.g., ATM 140, ATM device 260), merchant platform (e.g., merchant platform 158, merchant platform 270), and/or the like. Additionally, or alternatively, one or more process blocks of FIG. 5 may be performed by one or more components of a device 300, such as processor 320, memory 330, storage component 340, input component 350, output component 360, communication component 370, and/or the like.

As shown in FIG. 5, process 500 may include detect navigation, via a browser, to a transaction page of a website, wherein the transaction page is configured to facilitate an online transaction with the website (block 510). For example, the device may detect navigation, via a browser, to a transaction page of a website, as described above. In some implementations, the transaction page is configured to facilitate an online transaction with the website.

As further shown in FIG. 5, process 500 may include requesting, via a user interface of the browser and based on detecting the navigation to the transaction page, that a user input be provided to indicate whether a cash payment is to be made in association with the online transaction (block 520). For example, the device may request, via a user interface of the browser and based on detecting the navigation to the transaction page, that a user input be provided to indicate whether a cash payment is to be made in association with the online transaction, as described above.

As further shown in FIG. 5, process 500 may include receiving the user input (block 530). For example, the device may receive the user input, as described above.

As further shown in FIG. 5, process 500 may include obtaining, based on the user input indicating that the cash payment is to be made, a validation code (block 540). For example, the device may obtain, based on the user input indicating that the cash payment is to be made, a validation code, as described above.

As further shown in FIG. 5, process 500 may include displaying, via the user interface, the validation code to be processed by an authorized device in association with the cash payment (block 550). For example, the device may display, via the user interface, the validation code to be processed by an authorized device in association with the cash payment, as described above.

As further shown in FIG. 5, process 500 may include determining that the validation code was processed by the authorized device (block 560). For example, the device may determine that the validation code was processed by the authorized device, as described above.

As further shown in FIG. 5, process 500 may include obtaining, based on the validation code being processed by the authorized device, virtual card information associated with a virtual transaction card (block 570). For example, the device may obtain, based on the validation code being processed by the authorized device, virtual card information associated with a virtual transaction card, as described above.

As further shown in FIG. 5, process 500 may include facilitating, using the virtual card information associated with the virtual transaction card, the online transaction (block 580). For example, the device may facilitate, using the virtual card information associated with the virtual transaction card, the online transaction, as described above.

Process 500 may include additional implementations, such as any single implementation or any combination of implementations described below and/or in connection with one or more other processes described elsewhere herein.

In a first implementation, the user interface may be associated with a browser extension of the browser.

In a second implementation, alone or in combination with the first implementation, detecting the navigation to the transaction page may comprise detecting that the transaction page includes at least one of: text that is identifying the online transaction, a field that is being associated with receiving information for the online transaction, or an executable object that is being associated with executing the online transaction.

In a third implementation, alone or in combination with one or more of the first and second implementations, obtaining the validation code may comprise generating the validation code based on information associated with the online transaction, and obtaining the virtual card information associated with the virtual transaction card may comprise: sending, to a virtual transaction platform, a request to generate the virtual transaction card and provide the virtual card information associated with the virtual transaction card; and receiving, from the virtual transaction platform, the virtual card information associated with the virtual transaction card.

In a fourth implementation, alone or in combination with one or more of the first through third implementations, displaying the validation code may comprise: presenting the validation code via the user interface to permit the authorized device to process the validation code.

In a fifth implementation, alone or in combination with one or more of the first through fourth implementations, the authorized device may be associated with a service representative of a third party entity, and determining that the validation code was processed may comprise: receiving a notification that the validation code was processed by the service representative in association with receiving the cash payment from a user, and authenticating the notification based on credentials associated with the service representative.

In a sixth implementation, alone or in combination with one or more of the first through fifth implementations, process 500 includes requesting user information associated with a user; and facilitating the online transaction may comprise: populating corresponding user information fields of the transaction page with the user information, populating corresponding transaction account information fields with the virtual card information, and executing the online transaction via an executable object of the transaction page.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
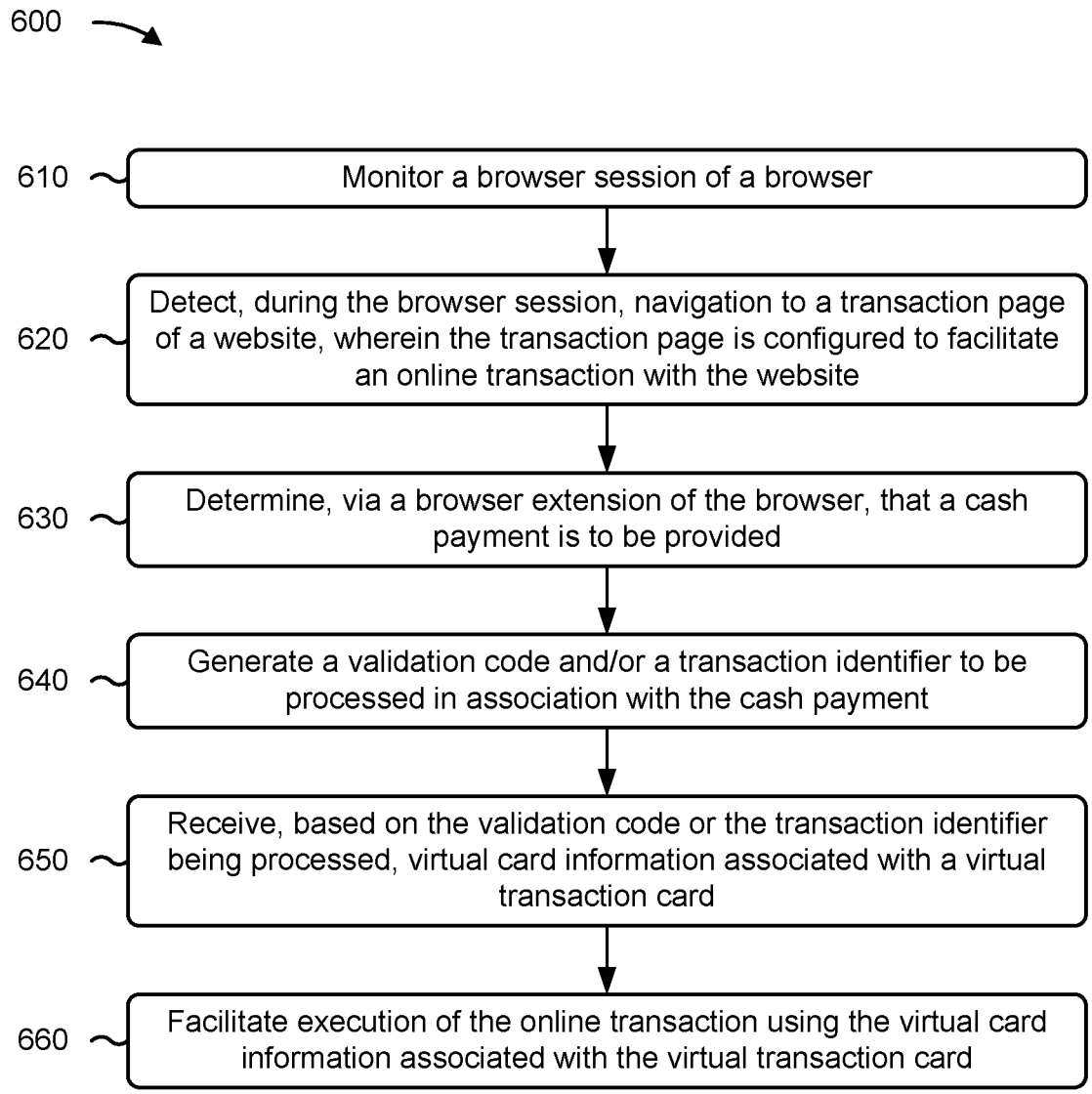

FIG. 6 is a flow chart of an example process 600 associated with permitting cash payments for online transactions. In some implementations, one or more process blocks of FIG. 6 may be performed by a device (e.g., client device 210 executing a browser extension 230, client device 102 executing the browser extension, and/or the like). In some implementations, one or more process blocks of FIG. 6 may be performed by another device or a group of devices separate from or including the device, such as a virtual transaction platform (e.g., virtual transaction platform 122, virtual transaction platform 240), authorized device (e.g., authorized device 130, authorized device 250), ATM device (e.g., ATM 140, ATM device 260), merchant platform (e.g., merchant platform 158, merchant platform 270), and/or the like. Additionally, or alternatively, one or more process blocks of FIG. 6 may be performed by one or more components of a device 300, such as processor 320, memory 330, storage component 340, input component 350, output component 360, communication component 370, and/or the like.

As shown in FIG. 6, process 600 may include monitoring a browser session of a browser (block 610). For example, the device may monitor a browser session of a browser, as described above.

As further shown in FIG. 6, process 600 may include detecting, during the browser session, navigation to a transaction page of a website, wherein the transaction page is configured to facilitate an online transaction with the website (block 620). For example, the device may detect, during the browser session, navigation to a transaction page of a website, as described above. In some implementations, the transaction page is configured to facilitate an online transaction with the website.

As further shown in FIG. 6, process 600 may include determining, via a browser extension of the browser, that a cash payment is to be provided (block 630). For example, the device may determine, via a browser extension of the browser, that a cash payment is to be provided, as described above.

As further shown in FIG. 6, process 600 may include generating a validation code and/or a transaction identifier to be processed in association with the cash payment (block 640). For example, the device may generate a validation code and/or a transaction identifier to be processed in association with the cash payment, as described above.

As further shown in FIG. 6, process 600 may include receiving, based on the validation code or the transaction identifier being processed, virtual card information associated with a virtual transaction card (block 650). For example, the device may receive, based on the validation code or the transaction identifier being processed, virtual card information associated with a virtual transaction card, as described above.

As further shown in FIG. 6, process 600 may include facilitating execution of the online transaction using the virtual card information associated with the virtual transaction card (block 660). For example, the device may facilitate execution of the online transaction using the virtual card information associated with the virtual transaction card, as described above.

Process 600 may include additional implementations, such as any single implementation or any combination of implementations described below and/or in connection with one or more other processes described elsewhere herein.

In a first implementation, monitoring the browser session may comprise: analyzing one or more webpages to identify a transaction indicator associated with a transaction involving an online provider of goods and/or services, and detecting the navigation to the transaction page may comprise detecting the navigation to the transaction page based on identifying the transaction indicator, wherein the transaction page is one of the one or more webpages.

In a second implementation, alone or in combination with the first implementation, the transaction indicator may include at least one of: text that identifies the online transaction, a field that is associated with receiving information for the online transaction, or an executable object that is associated with executing the online transaction.

In a third implementation, alone or in combination with one or more of the first and second implementations, prior to receiving the virtual card information associated with the virtual transaction card, process 600 includes providing the transaction identifier for processing by an automated teller machine, wherein the transaction identifier may be associated with the online transaction and may be configured to be input into an interface associated with the automated teller machine to allow a user to provide the cash payment via the automated teller machine.

In a fourth implementation, alone or in combination with one or more of the first through third implementations, the virtual transaction card may be configured for a single use that involves the execution of the online transaction.

In a fifth implementation, alone or in combination with one or more of the first through fourth implementations, facilitating executing of the online transaction may comprise: populating transaction account information fields with the virtual card information; and executing the online transaction via an executable object of the transaction page.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, configured to:
monitor, via a browser extension associated with the device, a browser session;
detect, via the browser extension, during the browser session, and based on the monitoring, navigation to a first page associated with an online transaction related to a website,
wherein the browser extension is configured to expand functionality of a browser to permit cash payments for the online transaction, and
wherein the detecting comprises:
determining, by the browser extension, that the first page includes a transaction indicator; and
executing at least one of the following to identify the transaction indicator:
a front-end analysis of the first page via optical character recognition, or
a back-end analysis of the first page via code analysis;
request, via the browser extension, via a dialog box, and based on detecting the navigation to the first page, an indication of whether a cash payment is to be made in association with the online transaction;
overlay, via the browser extension, the dialog box on the first page;
replace, via the browser extension, the first page with a second page that contains the dialog box;
obtain, based on the indication indicating that the cash payment is to be made, a code, wherein the code is used for verification of the online transaction;
provide the code to be processed by an authorized device in association with the cash payment;
determine that the code was processed by the authorized device;
obtain, via the browser extension, and based on determining that the code was processed by the authorized device, virtual card information associated with a virtual transaction card; and
execute the online transaction based on the virtual card information.

2. The device of claim 1, wherein the code is provided via the browser extension.

3. The device of claim 1, wherein the one or more processors, to detect the navigation to the first page, are configured to:
detect that the first page includes at least one of:
text that identifies the online transaction,
a field that is associated with receiving information for the online transaction, or
an executable object that is associated with executing the online transaction.

4. The device of claim 1, wherein the one or more processors, to obtain the virtual card information associated with the virtual transaction card, are configured to:
send, to a virtual transaction platform, a request to generate the virtual transaction card and provide the virtual card information associated with the virtual transaction card; and
receive, from the virtual transaction platform, the virtual card information associated with the virtual transaction card.

5. The device of claim 1, wherein the one or more processors, to provide the code, are configured to:
display the code to permit the authorized device to process the code.

6. The device of claim 1, wherein the authorized device is associated with a third party, and
wherein determining that the code was processed comprises:
receiving a notification that the code was processed by the third party in association with receiving the cash payment; and
authenticating the notification based on credentials associated with the third party.

7. The device of claim 1, wherein the one or more processors, are configured to:
populate corresponding user information fields of the second page;
populate corresponding transaction account information fields with the virtual card information; and
execute the online transaction via an executable object of the second page.

8. A non-transitory computer-readable medium storing instructions, the instructions comprising:
one or more instructions that, when executed by one or more processors, cause the one or more processors to:
monitor, via a browser extension of a browser, a browser session;
detect, via the browser extension during the browser session, and based on the monitoring, navigation to a first page associated with an online transaction related to a website,
wherein the detecting comprises:
determining, by the browser extension, that the first page includes a transaction indicator, and
executing at least one of the following to identify the transaction indicator:
a front-end analysis of the first page via optical character recognition, or
a back-end analysis of the first page via code analysis;
configure, via the browser extension, the browser to expand functionality of the browser to permit cash payments with the online transaction;
request, via the browser extension, via a dialog box, and based on detecting the navigation to the first page, an indication of whether a cash payment is to be made in associated with the online transaction;
overlay, via the browser extension, the dialog box on the first page;
replace, via the browser extension, the first page with a second page that contains the dialog box;
generate, based on the indication indicating that the cash payment is to be provided, a code to be processed in association with the cash payment,
wherein the code is based on information associated with the online transaction, and
wherein the code is processed for verification of the online transaction;
determine that the code was processed by an authorized device;
receive, via the browser extension and based on determining that the code was processed by the authorized device, virtual card information associated with a virtual transaction card; and
execute the online transaction using the virtual card information associated with the virtual transaction card.

9. The non-transitory computer-readable medium of claim 8, wherein the transaction indicator includes at least one of:
text that identifies the online transaction,
a field that is associated with receiving information for the online transaction, or
an executable object that is associated with executing the online transaction.

10. The non-transitory computer-readable medium of claim 8, wherein the one or more instructions, prior to receiving the virtual card information, further cause the one or more processors to provide the code for processing by an automated teller machine,
wherein the code is a transaction identifier, and
wherein the transaction identifier is configured to be provided to the automated teller machine to allow the cash payment via the automated teller machine.

11. The non-transitory computer-readable medium of claim 8, wherein the virtual transaction card is configured for a single use.

12. The non-transitory computer-readable medium of claim 8, wherein the one or more instructions, that cause the one or more processors to execute the online transaction, cause the one or more processors to:
populate transaction account information fields with the virtual card information; and
execute the online transaction via an executable object of the second page.

13. The non-transitory computer-readable medium of claim 8, wherein the one or more instructions cause the one or more processors to:
display the code to permit the authorized device to process the code.

14. A method, comprising:
monitoring, by a device and via a browser extension associated with the device, a browser session;
detecting, by the device, via the browser extension during the browser session, and based on the monitoring, navigation to a first page associated with an online transaction related to a website,
   wherein the browser extension is configured to expand functionality of a browser to permit cash payments for the online transaction, and
   wherein the detecting comprises:
      determining, by the browser extension, that the first page includes a transaction indicator;
      executing at least one of the following to identify the transaction indicator:
         a front-end analysis of the first page via optical character recognition, or
         a back-end analysis of the first page via code analysis;
requesting, by the device, via the browser extension, via a dialog box, and based on detecting the navigation to the first page, an indication of whether a cash payment is to be made in association with the online transaction;
overlaying, via the browser extension, the dialog box on the first page;
replacing, via the browser extension, the first page with second page that contains the dialog box;
obtaining, based on the indication indicating that the cash payment is to be made, a code that is used for verification of the online transaction;
providing, by the device, the code to be processed by an authorized device in association with the cash payment;
determining, by the device, that the code was processed by the authorized device;
obtaining, by the device, via the browser extension, and based on determining that the code was processed by the authorized device, virtual card information associated with a virtual transaction card; and
executing, by the device, the online transaction based on the virtual card information.

15. The method of claim 14, wherein the code is provided via the browser extension.

16. The method of claim 14, wherein detecting the navigation to the first page comprises detecting that the first page includes at least one of:
   text that identifies the online transaction,
   a field that is associated with receiving information for the online transaction, or
   an executable object that is associated with executing the online transaction.

17. The method of claim 14, wherein obtaining the virtual card information associated with the virtual transaction card comprises:
   sending, to a virtual transaction platform, a request to generate the virtual transaction card and provide the virtual card information associated with the virtual transaction card; and
   receiving, from the virtual transaction platform, the virtual card information associated with the virtual transaction card.

18. The method of claim 14, wherein providing the code comprises displaying the code to permit the authorized device to process the code.

19. The method of claim 14, wherein the authorized device is associated with a third party, and
   wherein determining that the code was processed comprises:
      receiving a notification that the code was processed by the third party in association with receiving the cash payment; and
      authenticating the notification based on credentials associated with the third party.

20. The method of claim 14, further comprising:
populating corresponding user information fields of the second page;
populating corresponding transaction account information fields with the virtual card information; and
executing the online transaction via an executable object of the second page.

* * * * *